US006706396B1

(12) United States Patent
Hayes et al.

(10) Patent No.: US 6,706,396 B1
(45) Date of Patent: Mar. 16, 2004

(54) PROCESSES FOR PRODUCING VERY LOW IV POLYESTER RESIN

(75) Inventors: Richard Allen Hayes, Brentwood, TN (US); Gregory W. Hoffmann, Nashville, TN (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/273,835

(22) Filed: Oct. 18, 2002

(51) Int. Cl.$^7$ .......................... B32B 15/02; C08G 63/78
(52) U.S. Cl. ...................... 428/402; 528/275; 528/277; 528/279; 528/281; 528/283; 528/284; 528/285; 528/296; 528/298; 528/302; 528/308; 528/308.6; 528/503; 524/779; 524/780; 524/783; 524/784; 524/788; 524/791; 525/437; 525/444
(58) Field of Search ................................ 528/275, 277, 528/279, 281, 283, 284, 285, 296, 298, 302, 308, 503; 524/779, 780, 783, 784, 788, 791; 525/437, 444

(56) References Cited

U.S. PATENT DOCUMENTS

| 3,563,942 A | 2/1971 | Heiberger |
| 3,948,859 A | 4/1976 | Sublett et al. |
| 4,094,721 A | 6/1978 | Sturm et al. |
| 4,104,262 A | 8/1978 | Schade |
| 4,165,420 A | 8/1979 | Rinehart |
| 4,166,895 A | 9/1979 | Buxbaum et al. |
| 4,252,940 A | 2/1981 | Sublett |
| 4,390,687 A | 6/1983 | Tung |
| 4,419,507 A | 12/1983 | Sublett |
| 4,585,687 A | 4/1986 | Posey et al. |
| 4,755,587 A | 7/1988 | Rinehart |
| 4,876,326 A | 10/1989 | Rinehart |
| 5,053,482 A | 10/1991 | Tietz |
| 5,292,783 A | 3/1994 | Buchanan et al. |
| 5,446,079 A | 8/1995 | Buchanan et al. |
| 5,480,962 A | 1/1996 | White et al. |
| 5,510,454 A | 4/1996 | Stouffer et al. |
| 5,532,333 A | 7/1996 | Stouffer et al. |
| 5,540,868 A | 7/1996 | Stouffer et al. |
| 5,633,018 A | 5/1997 | Stouffer et al. |
| 5,714,262 A | 2/1998 | Stouffer et al. |
| 5,744,074 A | 4/1998 | Stouffer et al. |
| 5,830,982 A | 11/1998 | Stouffer et al. |
| 6,063,464 A | 5/2000 | Charbonneau et al. |
| 6,335,422 B2 | 1/2002 | Schiavone |

FOREIGN PATENT DOCUMENTS

WO    WO 01/86044 A1    11/2001

OTHER PUBLICATIONS

R. Storbeck, et al., Synthesis and Thermal Analysis of Copolyesters Deriving from 1,4:3,6–Dianhydrosorbitol, Ethylene Glycol, and Terephthalic Acid, Journal of Applied Polymer Science, 1996, pp 1199–1202, vol. 59, John Wiley & Sons, Inc.

*Primary Examiner*—Samuel A. Acquah

(57) ABSTRACT

The present invention provides processes for producing certain very low inherent viscosity polyesters. Also provided are the low inherent viscosity polyesters in discrete particulate form, and processes for producing the particulate polyesters. The discrete particulate materials are desirable for use in further processes.

42 Claims, No Drawings

PROCESSES FOR PRODUCING VERY LOW IV POLYESTER RESIN

BACKGROUND OF THE INVENTION

1. Field of the Invention

The present invention relates to a process for producing very low inherent viscosity (IV) polyester resin. More specifically but not by way of limitation, the present invention relates to production of pelletized polyethylene terephthalate, polybutylene terephthalate and corresponding polyester naphthalates having an inherent viscosity within the range of about 0.20 dL/g to about 0.45 dL/g.

2. Description of the Related Art

Emerging technologies, such as melt blown fibers and the nonwoven textiles produced therefrom, require very low melt viscosity polymeric materials. In a melt-blowing process, a non-woven web is formed by extruding a molten polymer through a die and then attenuating and breaking the resulting filaments with a hot, high-velocity gas stream. This process generates short, very fine fibers that can be collected on a moving belt where they bond with each other during cooling. Melt-blown webs can be made that exhibit very good barrier properties.

For poly(ethylene terephthalate) materials, this has been translated to polyesters which have inherent viscosities in the range of 0.25 to 0.45 dL/g, as disclosed by Rudisill, in WO 01/86044 A1. The production of discrete, particulate poly(ethylene terephthalate) materials with inherent viscosities within this range have proven to be difficult. For example, according to the Rudisill disclosure, poly(ethylene terephthalate) materials with inherent viscosities of 0.63 dL/g were used in the examples and then subsequently hydrolytically or thermally cracked down to poly(ethylene terephthalate) materials with inherent viscosities of 0.34 dL/g. One shortcoming of disclosed procedure is that the added cracking processes provides further complications to the overall processes, which would be desirable to avoid.

Typical poly(ethylene terephthalate) production processes are not able to directly produce materials with inherent viscosities below about 0.45 dL/g. In a typical poly(ethylene terephthalate) production process, the polyester exits the polymerizer through a die plate and falls through an air gap of typically 1 to 24 inches, more commonly 6 to 12 inches, to a water trough. The polyester strand hardens in the water trough and is then pelletized. Poly(ethylene terephthalate) materials with inherent viscosities below about 0.45 dL/g do not have the melt strength to be self supporting. This is evident in the above mentioned typical process in the form of the strands breaking or dropping in the air gap because they do not have the melt strength to support their own weight. As one skilled in the art would understand, this would preclude the production of such low inherent viscosity polyesters by typical processes.

Particulate poly(ethylene terephthalate) materials with inherent viscosities within the range of 0.20 to 0.45 dL/g are available. However, they are provided through crushing or pulverization processes that produce irregularly shaped particles having a wide range of sizes. For example, polymers may be formed into solidified strands, ribbons, or sheets, which may then be broken into particles. Fracturing or granulation of a sheet, for example, into particles may be accomplished by various processes including ball milling. Such processes of particle formation, however, may result in particles that are not uniform in size and/or shape. Furthermore, such processes may generate an undesirable amount of fines, i.e. particles of sizes substantially smaller than the average size or a target size, which further complicates particle handling and processing. Such irregular, non-uniform, particles provide difficulties within further process steps, such as crystallization, drying and feeding to extruders. It is desirable to provide poly(ethylene terephthalate) materials having inherent viscosities within the range of 0.20 to 0.45 dL/g, in a uniform particulate form convenient for use in subsequent processes.

Attempts have been made to overcome these deficiencies by producing prepolymers having intrinsic viscosities within the range of 0.10 to 0.35 dL/g in the form of spherical beads, for example, as disclosed in U.S. Pat. No. 4,165,420. Spherical prepolymer beads are disclosed having diameters in the range of 100 to 250 microns, and are produced either by spray congealing or atomization. U.S. Pat. No. 4,755,587 and U.S. Pat. No. 4,876,326 disclose the production of polyester prepolymers in the form of porous pills. However, the disclosed processes require complex processes to produce powders or porous pills, and the disclosures do not include the production of conventional pellets having desirable intrinsic viscosities and uniformity.

Other processes have been developed to fill the need for a uniform, discrete particulate form of very low inherent viscosity poly(ethylene terephthalate) materials. For example, it has been suggested that pastillation solves this need. Pastillation is a process wherein one forms polymer droplets from the polymer melt and subsequently solidifies the polymer droplets into polymer particles or pellets. An example of the use of pastillation processes for the production of uniform, discrete particles of low inherent viscosity polyesters is taught by Stouffer, et al., in U.S. Pat. No. 5,540,868. Further disclosures of the use of pastillation processes can be found in, for example; U.S. Pat. No. 5,510,454, U.S. Pat. No. 5,532,333, U.S. Pat. No. 5,633,018, U.S. Pat. No. 5,714,262, U.S. Pat. No. 5,744,074, and U.S. Pat. No. 5,830,982. A shortcoming of such pastillation processes is the need for complex equipment, such as rotoformers and heated belts, and complicated manufacturing schemes required.

Schiavone, in U.S. Pat. No. 6,335,422, discloses a process for producing certain copolyesters, including copolyesters comprising terephthalic acid, 84 to 94 mole percent ethylene glycol, 2 to 6 mole percent diethylene glycol and 4 to 10 mole percent cyclohexane dimethanol to an intrinsic viscosity of between 0.25 and 0.40 dL/g, forming the prepolymer into chips and in turn, solid state polymerizing the chips to a higher intrinsic viscosity. With regard to how the materials are formed into particles, the disclosure states that prior to the solid state polymerization step, the copolyester prepolymer composition is formed into discrete particles by "conventional techniques (e.g., strand pelletization and hot-cut pelletization-drops from a vibrating plate die, or drops or pastillates from a rotating die or plate will not work within the intrinsic viscosity range of the invention)". The use of homopoly(ethylene terephthalate) in forming polyesters having low viscosities is not included in the disclosure.

BRIEF SUMMARY OF THE INVENTION

One aspect of the present invention provides processes for producing very low inherent viscosity polyesters in a certain discrete particulate form. The processes described herein are preferably used to form polyesters selected from the group consisting of poly(ethylene terephthalate), poly(1,4-butylene terephthalate), poly(ethylene 2,6-naphthalenedicarboxylate), and poly(1,4-butylene 2,6- naphthlalenedicarboxylate). The polyesters may be optionally branched. The polyesters have inherent viscosities in the range of about 0.20 to about 0.45 dL/g. The polyesters are formed by providing one aromatic compound selected from the group consisting of terephthalic acid, 2,6-naphthalene dicarboxylic acid, and acid chlorides and lower esters thereof; and contacting, under polymerization conditions, the aromatic dicarboxylic acid with one aliphatic diol selected from the group consisting of ethylene glycol and 1,4-butanediol, to copolymerize the aromatic dicarboxylic acid with said aliphatic diol and form the polymer. The term "lower esters" is known to those skilled in the art. Preferably, for use in the processes disclosed herein, lower esters have 5 or fewer carbon atoms, more preferably 4 or fewer carbon atoms.

In preferred embodiments, the polyesters are formed by providing one aromatic compound selected from the group consisting of terephthalic acid, 2,6-naphthalene dicarboxylic acid, and lower esters thereof; and contacting, under polymerization conditions, the aromatic dicarboxylic acid or ester with one aliphatic diol selected from the group consisting of ethylene glycol and 1,4-butanediol, to copolymerize the aromatic dicarboxylic acid with said aliphatic diol and form the polymer.

A further aspect of the present invention is discrete particulate polyesters having an inherent viscosity in the range of about 0.20 to about 0.45 dL/g produced by providing one aromatic dicarboxylic compound selected from the group consisting of terephthalic acid, 2,6-naphthalene dicarboxylic acid, and acid chlorides and lower esters thereof; and contacting, under polymerization conditions, the aromatic dicarboxylic compound with one aliphatic diol selected from the group consisting of ethylene glycol and 1,4-butanediol, to copolymerize the aromatic dicarboxylic acid with the aliphatic diol and form the polymer.

The polyesters can be utilized in processes such as, for example, melt blown fiber formation.

DETAILED DESCRIPTION OF THE INVENTION

With prior processes for producing low inherent viscosity polyesters, such as, for example, those described herein above, particles are generally of a size and shape that are not easily handled through conventional post production processes, such as crystallization, drying and extrusion processes. Even underwater cutters designed for low viscosity polymers, such as cutters manufactured by Gala, provide a non-conventional pellet, typically spheroid, which requires extensive process modifications to feed the particles to subsequent production processes. The processes disclosed herein, on the other hand, provide pellet sizes and shapes substantially the same as those produced by conventional processes for forming and pelletizing high inherent viscosity polymers.

The polyesters produced according to the processes disclosed herein have an inherent viscosity ("IV"), which is an indicator of molecular weight, in the range of about 0.20 to 0.45 dL/g. Preferably, the inherent of the polyesters are in the range of about 0.20 to 0.40 dL/g, as measured on a 0.5 percent (weight/volume) solution of the polyester in a 50:50 (weight) solution of trifluoroacetic acid/dichloromethane solvent system at room temperature. More preferably, the inherent viscosity of the polyesters measured under such conditions is in the range of 0.25 to 0.35 dL/g. The inherent viscosity is preferably sufficient to produce the polyester in final form for the manufacture of certain articles, such as melt blown fiber. The polymerization conditions may be adjusted to obtain the desired inherent viscosities of at least about 0.20 and about 0.45 dL/g or less.

The polyesters prepared according to the processes disclosed herein are preferably in the form of circular cylinders with diameters in the range of about 0.5 mm to 10 mm and lengths in the range of about 0.5 to 10 mm. Also preferably, the cylindrical pellets have a nominal pellet size of about 2 to 3 mm in diameter and about 2.5 to 3.5 mm in length. The ability to produce particles within the preferred size range and having the preferred cylindrical form is an advantage provided by the processes disclosed herein. Thus, the present invention provides processes for producing very low inherent viscosity polyesters in a certain discrete particulate form. Preferred polyesters produced by the processes disclosed herein are selected from the group consisting of poly(ethylene terephthalate), poly(1,4-butylene terephthalate), poly(ethylene 2,6-naphthlalenedicarboxylate), and poly(1,4-butylene 2,6-naphthlalenedicarboxylate).

The polyesters are preferably formed by providing one aromatic dicarboxylic compound selected from the group consisting of terephthalic acid, 2,6-naphthalene dicarboxylic acid, and acid chlorides and lower esters thereof; and contacting, under polymerization conditions, the aromatic compound with one aliphatic diol selected from the group consisting of ethylene glycol and 1,4-butanediol, to copolymerize the aromatic dicarboxylic acid with the aliphatic diol and form the polymer.

Optionally, a polyfunctional branching agent can be used, to produce a branched polyester. The polyfunctional branching agent can be any polyfunctional branching agent known for use with polyesters, and is preferably a compound having a total of three or more functional groups selected from carboxylic acid functional groups, hydroxy functional groups, and mixtures thereof. Compounds having a "carboxylic acid functional group" include carboxylic acids, lower alkyl esters of carboxylic acids, glycolate esters of carboxylic acids, and the like. In some embodiments, a mixture of two or more branching agents can be used. Specific examples of suitable polyfunctional branching agents include 1,2,4-benzenetricarboxylic acid, (trimellitic acid); trimethyl-1,2,4-benzenetricarboxylate; tris(2-hyroxyethyl)-1,2,4-benzenetricarboxylate; trimethyl-1,2,4-benzenetricarboxylate, 1,2,4-benzenetricarboxylic anhydride, (trimellitic anhydride); 1,3,5-benzenetricarboxylic acid; 1,2,4,5-benzenetetracarboxylic acid (pyromellitic acid); 1,2,4,5-benzenetetracarboxylic dianhydride (pyromellitic anhydride); 3,3',4,4'-benzophenonetetracarboxylic dianhydride; 1,4,5,8-naphthalenetetracarboxylic dianhydride; citric acid; tetrahydrofuran-2,3,4,5-tetracarboxylic acid; 1,3,5-cyclohexanetricarboxylic acid; pentaerythritol, 2-(hydroxymethyl)-1,3-propanediol, 2,2-bis (hydroxymethyl)propionic acid; trimer acid and the like. Essentially any polyfunctional material that includes three or more carboxylic acid or hydroxyl functions may be useful as a polyfunctional branching agent. The polyfunctional branching agent is preferably added in the amount of 0 to about 1.0 mole percent based on 100 mole percent total dicarboxylic acids.

The polyesters may be prepared by conventional polycondensation techniques. The final product compositions may vary depending upon the process of preparation used, particularly in the amount of diol that is present within the polymer. The processes for preparing the polyesters include the reaction of diol monomers with acid chlorides. For example, acid chlorides of a dicarboxylic acid may be combined with a diol in a solvent, such as toluene, in the presence of a base, such as pyridine, which neutralizes the hydrochloric acid as it is produced. Such procedures are known to those skilled in the art and are disclosed, for example, in R. Storbeck, et. al., *J. Appl. Polymer Science*, Vol. 59, pp. 1199–1202 (1996). Other well-known variations using acid chlorides may also be used, such as polymerization, or the monomers may simply be stirred together while heating.

When the polymer is made using acid chlorides, the relative ratio of each type of monomer unit in the product polymer is about the same as the relative ratio of each type of monomer charged to a polymerization reactor. Therefore, the ratio of monomers charged to the reactor is about the same as the desired ratio in the product. A stoichiometric equivalent of the diol component and the diacid component generally will be used to produce the polymer. For the low inherent viscosity polyesters produced according to the processes disclosed herein, stoichiometric imbalances of the monomer ratios, such as excesses of the diol or the diacid components, may be used to promote the low inherent viscosities desired.

Preferably, the polyesters are produced by a melt polymerization process. In melt polymerization, the dicarboxylic acid component, (as one or more acids, esters, or a mixture thereof), the diol, and the optional branching agent are combined in the presence of a catalyst to a temperature sufficiently high that the monomers combine to form esters and diesters, then oligomers, and finally polymers. The product of the polymerization process is a molten polymer. Generally, the diol component is volatile and distills from the reactor as the polymerization proceeds. Suitable melt polymerization processes are disclosed, for example, in U.S. Pat. No. 3,563,942, U.S. Pat. No. 3,948,859, U.S. Pat. No. 4,094,721, U.S. Pat. No. 4,104,262, U.S. Pat. No. 4,166,895, U.S. Pat. No. 4,252,940, U.S. Pat. No. 4,390,687, U.S. Pat. No. 4,419,507, U.S. Pat. No. 4,585,687, U.S. Pat. No. 5,053,482, U.S. Pat. No. 5,292,783, U.S. Pat. No. 5,446,079, U.S. Pat. No. 5,480,962, and U.S. Pat. No. 6,063,464 and the references cited therein.

The melt polymerization conditions, particularly the amounts of monomers used, depend on the polymer composition that is desired. The amount of the diol component, the dicarboxylic acid component, and the optional branching agent are chosen so that the final polymeric product contains the desired amounts of the various monomer units, preferably with approximately equimolar amounts of monomer units derived from the respective diol and diacid components. The amounts of the diol and diacid component may be adjusted to provide the desired very low inherent viscosities. Because of the volatility of some of the monomers, especially some of the diol component, and depending on such variables as whether the reactor is sealed, (i.e., is under pressure), the polymerization temperature ramp rate, and the efficiency of the distillation columns used in synthesizing the polymer, some of the monomers may be required in excess of the desired final molar amount at the beginning of the polymerization reaction and removed by distillation as the reaction proceeds. This is particularly true of the diol component.

The exact amount of monomers to be charged to a particular reactor can be determined by a skilled practitioner, but often will be in the ranges below. Excesses of the diacid and diol may be charged, and the excess diacid and diol can be removed by distillation or other means of evaporation as the polymerization reaction proceeds. The diol is desirably charged at a level 0 to 100 percent greater than the desired incorporation level in the final product. For diols that are useful as a diol component according to the processes described herein, and are volatile under the preferred polymerization conditions, such as ethylene glycol or 1,4-butanediol, 30 to 100 percent excesses are desirably charged.

The ranges given herein for the amount of monomers used allow for the wide variation in monomer loss during polymerization. The amount of monomer loss depends in part on the efficiency of distillation columns or other recovery and recycle systems used, and thus the ranges provided are only an approximation. Exact amounts of monomers that are charged to a specific reactor to achieve a specific composition can be determined by a skilled practitioner.

In a preferred polymerization process, the monomers are combined, and are heated gradually with mixing in the presence of a catalyst or catalyst mixture to a temperature preferably in the range of about 230° C. to about 300° C., more preferably about 250° C. to about 295° C. The conditions and the catalysts are determined in part by whether the diacids are polymerized as true acids or as dimethyl esters. The catalyst or catalyst mixture can be included initially with the reactants, and/or can be added one or more times to the mixture as it is heated. The catalyst used may be modified as the reaction proceeds. The heating and stirring are continued for a sufficient time and to a sufficient temperature, generally with removal by distillation of excess reactants, to yield a molten polymer having a molecular weight to be suitable for the present invention.

Catalysts that may be used include salts of Li, Ca, Mg, Mn, Zn, Pb, Sb, Sn, Ge, and Ti, such as acetate salts and oxides, including glycol adducts, and Ti alkoxides. Catalysts for polymerization of monomers to form polyesters are known to those skilled in the art, and a specific catalyst or combination or sequence of catalysts for use in the polymerization of particular monomers may be determined by a skilled practitioner. The preferred catalyst and preferred conditions depend upon, for example, whether the diacid monomer is polymerized as the free diacid or as a dimethyl ester and the exact chemical identity of the diol component.

The polymerization processes disclosed herein include the use of an underwater strand cutter. However, although water is the most typical strand-cooling medium, other cooling media may be employed. The water may be at about room temperature, or may be chilled or heated, depending on the polymer composition and the process to be employed, among other factors. The underwater strand cutter supports nascent molten polyester strands as they exit from the polymerization through the die plates. The underwater cutter preferably has an air gap in the range of about 1 to 4 inches, typically from about 2 to about 3 inches. In comparison to previously disclosed processes for producing polyesters, the processes disclosed herein utilize a reduced air gap, which allows for the production of the desired very low inherent viscosity in the polyesters produced.

Support for the strands is provided by a water slide, which is typically grooved to keep the polyester strands separated and guide the strands into the water. The water slide not only supports the polyester strands, which have very low melt strength, but in addition serves to harden them by quenching them in water or other cooling medium. The water slide differs from a water bath in that it is inclined and thus provides better support to the strands than is provided in a water bath. Preferably the water slide is inclined about 10 degrees to about 20 degrees from the vertical. The water slide is typically about 2 to 10 feet in length. However shorter or longer water slides may be utilized if desired or the process dictates. Typically the water slide is flooded with water. By "flooded with water" is meant that, in contrast to submerging, water is pumped so that it flows over the strands on the water slide.

The strands are guided to a pelletizer to produce the polyester particles, also referred to by those skilled in the art as "pellets". The particles are preferably cylindrical. Preferably, the particles have average diameters within the range from about 0.5 mm to about 10 mm. More preferably, the particles have average diameters within the range of about 1 mm to about 5 mm, and even more preferably, the particles have average diameters within the range from about 2 mm to about 3 mm. Also preferably, the particles have average lengths within the range from about 0.5 to about 10 mm. More preferably, the particles have average lengths within the range from about 1 mm to about 5 mm. Even more preferably, the particles have average lengths within the range from about 2.5 mm to about 3.5 mm. In some preferred embodiments, the particles are cylindrical pellets having a nominal pellet size of about 2 to 3 mm in diameter and about 2.5 to 3.5 mm in length. It is preferred that the polyester pellets are substantially uniform in size. By substantially uniform is meant that preferably about 80 percent or more, more preferably about 90 percent or more of the pellets have sizes within the preferred cited ranges.

The ability to produce particles within the preferred size range and having a cylindrical shape is an advantage provided by the processes disclosed herein. However, the polymer pellet size may be varied, if desired, based on process conditions and intended further processing, within the range of about 0.5 to 10 mm in diameter and about 0.5 to 10 mm in length. Adequate process equipment is commercially available from, for example, Rieter Autornatik GmbH under the tradenames of Automatik USG 600, Vario USG 200 H, Vario USG 300 H, Vario USG 450 H, Vario USG 600 H, and Opto USG 900 H.

Test Methods

Inherent Viscosity, (IV), is defined in "Preparative Methods of Polymer Chemistry", W. R. Sorenson and T. W. Campbell, 1961, p. 35. It is determined at a concentration of 0.5 g./100 mL of a 50:50 weight percent trifluoroacetic acid:dichloromethane acid solvent system at room temperature by a Goodyear R-103B method.

Comparative Example CE 1

To a 7.3 cubic meter stainless steel autoclave was charged dimethyl terephthalate, (4,045.63 pounds), ethylene glycol, (2,069.00 pounds), and manganese(II) acetate tetrahydrate, (1.78 pounds). The autoclave is purged three times with nitrogen and heated to 250° C. over 2.5 hours with stirring. Over this heating cycle, distillate was recovered. After the stirred reaction mixture was at 250° C. for 0.50 hours, a 10 weight percent phosphoric acid solution in ethylene glycol, (4.75 pounds), was added. The reaction mixture was then transferred, through the application of pressure, over to a second 6 cubic meter stainless steel polymerization autoclave. The stirred reaction mixture was then heated to 295° C. With continued heating and stirring, vacuum was staged onto the autoclave. The resulting reaction mixture was stirred at 272° C. under full vacuum, (pressure equal to or less than 0.5 mm Hg), until the desired inherent viscosity was achieved, as indicated by the torque applied to the agitator or through the amperage requirements of the agitator's motor. This took a total of 1.7 hours residence time within the polymerization autoclave. The vacuum was then released, a nitrogen pressure applied and the resulting reaction mixture was extruded out of the autoclave through a dieplate as strands and pelletized with an Automatik USG 600 cutter. This process included extruding the molten polymer strand through a 2.3 inch air gap onto a 4 foot long grooved water slide flooded with water. The water was kept at about 20° C. The polymer strands were then guided into a pelletizer and chopped.

Very little of the polymer produced within this Comparative Example was able to be pelletized. The material that was pelletized had a very irregular, rough cut. As such, this product was not found acceptable.

The polymer was tested for inherent viscosity, as described above and was found to have an IV of 0.19 dL/g.

EXAMPLE 1

To a 7.3 cubic meter stainless steel autoclave was charged dimethyl terephthalate, (4,045.63 pounds), ethylene glycol, (2,069.00 pounds), manganese(II) acetate tetrahydrate, (1.78 pounds), and antimony(III) trioxide, (1.44 pounds). The autoclave was purged three times with nitrogen and heated to 250° C. over 2.5 hours with stirring. Over this heating cycle, distillate was recovered. After the stirred reaction mixture was at 250° C. for 0.50 hours, a 10 weight percent phosphoric acid solution in ethylene glycol, (4.75 pounds), was added. The reaction mixture was then transferred, by the application of pressure, to a second, 6 cubic meter, stainless steel polymerization autoclave. The stirred reaction mixture was then heated to 295° C. With continued heating and stirring, vacuum was staged onto the autoclave. The resulting reaction mixture was stirred at 272° C. under full vacuum, (pressure equal to or less than 0.5 mm Hg), until the desired inherent viscosity was achieved, as indicated by the torque applied to the agitator or through the amperage requirements of the agitator's motor. This took a total of 1.7 hours residence time within the polymerization autoclave. The vacuum was then released, a nitrogen pressure applied and the resulting reaction mixture was extruded out of the autoclave through a die plate as strands and pelletized with an Automatik USG 600 cutter. This process included extruding the molten polymer strand through a 2.3 inch airgap onto a 4 foot long grooved water slide flooded with water. The water was kept at about 20° C. The polymer strands were then guided into a pelletizer and chopped.

The polymer produced within Example 1 was able to be pelletized. The material pelletized material had a regular, good cut providing a nominal 2.5 mm by 3.0 mm long pellet with a low level of fines. As such, this product was found acceptable.

The polymer was tested for inherent viscosity, as described above and was found to have an IV of 0.25 dL/g.

EXAMPLE 2

To a 7.3 cubic meter stainless steel autoclave was charged dimethyl terephthalate, (4,045.63 pounds), ethylene glycol, (2,069.00 pounds), manganese(II) acetate tetrahydrate, (1.78 pounds), and antimony(III) trioxide, (1.44 pounds). The autoclave was purged three times with nitrogen and heated to 250° C. over 2.5 hours with stirring. Over this heating cycle, distillate was recovered. After the stirred reaction mixture was at 250° C. for 0.50 hours, a 10 weight percent phosphoric acid solution in ethylene glycol, (4.75 pounds), was added. The reaction mixture was then transferred, by the application of pressure, to a second, 6 cubic meter, stainless steel polymerization autoclave. The stirred reaction mixture was then heated to 295° C. With continued heating and stirring, vacuum was staged onto the autoclave. The resulting reaction mixture was stirred at 272° C. under full vacuum, (pressure equal to or less than 0.5 mm Hg), until the desired inherent viscosity was achieved. The achievement of the desired viscosity was indicated by the torque applied to the agitator or by the amperage requirements of the agitator motor. This takes a total of 1.7 hours residence time within the polymerization autoclave The vacuum was then released, a nitrogen pressure applied and the resulting reaction mixture was extruded out of the autoclave through a die plate as strands and pelletized with an Automatik USG 600 cutter. This process included extruding the molten polymer strand through a 2.3 inch air gap onto a 4 foot long grooved water slide flooded with water. The water was kept at about 20° C. The polymer strands were then guided into a pelletizer and chopped.

The polymer produced within this Example was able to be pelletized. The material when pelletized had a regular, excellent cut providing a nominal 2.5 mm by 3.0 mm long pellet with no apparent fines. As such, this product was found acceptable.

The polymer was tested for inherent viscosity, as described above and was found to have an IV of 0.29 dL/g.

Having thus described and exemplified the invention with a certain degree of particularity, it should be appreciated that the following claims are not to be so limited but are to be afforded a scope commensurate with the wording of each element of the claim and equivalents thereof.

We claim:

1. A process for producing a polymer in cylindrical particulate form having an inherent viscosity within the range of about 0.20 dL/g to about 0.45 dL/g, comprising providing one aromatic compound selected from the group consisting of terephthalic acid, 2,6-naphthalene dicarboxylic acid, and lower esters and acid chlorides thereof; contacting, under polymerization conditions, said aromatic compound with one aliphatic diol selected from the group consisting of ethylene glycol and 1,4-butanediol, to copolymerize said aromatic dicarboxylic acid with said aliphatic diol and to form a molten polymer; extruding the molten polymer through a die plate into strands; passing the molten strands through an air gap of less than about 4 inches onto a water slide; quenching the strands with a cooling medium; and pelletizing the strands to form cylindrical particles.

2. A process of claim 1 wherein said inherent viscosity is in the range of about 0.20 to about 0.40 dL/g.

3. A process of claim 1 wherein said inherent viscosity is in the range of about 0.25 to about 0.35 dL/g.

4. A process of claim 1 wherein said particles have average diameters within the range from about 0.5 mm to about 10 mm.

5. A process of claim 1 wherein said particles have average diameters within the range from about 1 mm to about 5 mm.

6. A process of claim 1 wherein said particles have average diameters within the range from about 2 mm to about 3 mm.

7. A process of claim 1 wherein said particles have average lengths within the range from about 0.5 to about 10 mm.

8. A process of claim 1 wherein said particles have average lengths within the range from about 1 mm to about 5 mm.

9. A process of claim 1 wherein said particles have average lengths within the range from about 2.5 mm to about 3.5 mm.

10. A process of claim 1, wherein said pellets are substantially uniform.

11. A process of claim 1 wherein said process is carried out in the presence of a polyfunctional branching agent.

12. A process of claim 11 wherein said polyfunctional branching agent is selected from the group consisting of 1,2,4-benzenetricarboxylic acid, (trimellitic acid); trimethyl-1,2,4-benzenetricarboxylate; tris(2-hyroxyethyl)-1,2,4-benzenetricarboxylate; trimethyl-1,2,4-benzenetricarboxylate, 1,2,4-benzenetricarboxylic anhydride, (trimellitic anhydride); 1,3,5-benzenetricarboxylic acid; 1,2,4,5-benzenetetracarboxylic acid (pyromellitic acid); 1,2,4,5-benzenetetracarboxylic dianhydride (pyromellitic anhydride); 3,3',4,4'-benzophenonetetracarboxylic dianhydride; 1,4,5,8-naphthalenetetracarboxylic dianhydride; citric acid; tetrahydrofuran-2,3,4,5-tetracarboxylic acid; 1,3,5-cyclohexanetricarboxylic acid; pentaerythritol, 2-(hydroxymethyl)-1,3-propanediol, 2,2-bis (hydroxymethyl) propionic acid; trimer acid.

13. A process of claim 1, wherein said process is carried out in the presence of a catalyst.

14. A process of claim 13 wherein said catalyst is selected from the group consisting of salts, oxides or glycol adducts of Li, Ca, Mg, Mn, Zn, Pb, Sb, Sn, Ge, and Ti.

15. A process of claim 14 wherein said catalyst is an acetate salt.

16. A process of claim 1, wherein said process is carried out at a temperature within in the range of 230° C. to about 300° C.

17. A process of claim 1, wherein said process is carried out at a temperature within the range of 250° C. to 295° C.

18. A process of claim 1, wherein said polymer is poly (ethylene terephthalate).

19. A cylindrical particle formed from a polyester selected from the group consisting of poly(ethylene terephthalate), poly(1,4-butylene terephthalate), poly(ethylene 2,6-naphthalenedicarboxylate), and poly(1,4-butylene 2,6-naphthalenedicarboxylate), said polyester having an intrinsic viscosity within the range of about 0.20 dL/g to about 0.45 dL/g, wherein said particle is formed by providing one aromatic compound selected from the group consisting of terephthalic acid, 2,6-naphthalene dicarboxylic acid, and lower esters thereof; contacting, under polymerization conditions, said aromatic compound with one aliphatic diol selected from the group consisting of ethylene glycol and 1,4-butanediol, to copolymerize said aromatic dicarboxylic acid with said aliphatic diol and to form a molten polyester; extruding the molten polyester through a die plate into strands; passing the molten strands through an air gap of less than about 4 inches onto a water slide; quenching the strands with water; and pelletizing the strands to form cylindrical particles.

20. A particle of claim 19 having a diameter within the range from about 0.5 mm to about 10 mm.

21. A particle of claim 19 having a diameter within the range from about 1 mm to about 5 mm.

22. A particle of claim 19 having a diameter within the range from about 2 mm to about 3 mm.

23. A particle of claim 19 having a length within the range from about 0.5 to about 10 mm.

24. A particle of claim 19 having a length within the range from about 1 mm to about 5 mm.

25. A particle of claim 19 having a length within the range from about 2.5 mm to about 3.5 mm.

26. A particle of claim 19, wherein said polyester is poly(ethylene terephthalate).

27. A particle of claim 19 wherein said polyester has an intrinsic viscosity within the range of about 0.25 dL/g to about 0.35 dL/g.

28. A particle of claim 19 wherein said process is carried out in the presence of a polyfunctional branching agent.

29. A particle of claim 19 wherein said polyfunctional branching agent is selected from the group consisting of 1,2,4-benzenetricarboxylic acid, (trimellitic acid); trimethyl-1,2,4-benzenetricarboxylate; tris(2-hyroxyethyl)-1,2,4-benzenetricarboxylate; trimethyl-1,2,4-benzenetricarboxylate, 1,2,4-benzenetricarboxylic anhydride, (trimellitic anhydride); 1,3,5-benzenetricarboxylic acid; 1,2,4,5-benzenetetracarboxylic acid (pyromellitic acid); 1,2,4,5-benzenetetracarboxylic dianhydride (pyromellitic anhydride); 3,3',4,4'-benzophenonetetracarboxylic dianhydride; 1,4,5,8-naphthalenetetracarboxylic dianhydride; citric acid; tetrahydrofuran-2,3,4,5-tetracarboxylic acid; 1,3,5-cyclohexanetricarboxylic acid; pentaerythritol, 2-(hydroxymethyl)-1,3-propanediol, 2,2-bis (hydroxymethyl) propionic acid; trimer acid.

30. A particle of claim 19, wherein said process is carried out in the presence of a catalyst.

31. A particle of claim 19, wherein said catalyst is selected from the group consisting of salts, oxides, or glycol adducts of Li, Ca, Mg, Mn, Zn, Pb, Sb, Sn, Ge, and Ti.

32. A particle of claim 19, wherein said catalyst is an acetate salt.

33. A particle of claim 19, wherein said process is carried out at a temperature within in the range of 230° C. to about 300° C.

34. A particle of claim 19, wherein said process is carried out at a temperature within the range of 250° C. to 295° C.

35. A particle of claim 19, wherein said polymer is poly(ethylene terephthalate).

36. A cylindrical particle consisting essentially of a polyester selected from the group consisting of poly(ethylene terephthalate), poly(1,4-butylene terephthalate), poly(ethylene 2,6-naphthalenedicarboxylate), and poly(1,4-butylene 2,6-naphthalenedicarboxylate), said polyester having an intrinsic viscosity of about 0.45 dL/g or less, a diameter within the range from about 0.5 mm to about 10 mm, and a length within the range from about 0.5 to about 10 mm.

37. A particle of claim 36 having a diameter within the range from about 1 mm to about 5 mm.

38. A particle of claim 36 having a diameter within the range from about 2 mm to about 3 mm.

39. A particle of claim 36 having a length within the range from about 1 mm to about 5 mm.

40. A particle of claim 36 having a length within the range from about 2.5 mm to about 3.5 mm.

41. A particle of claim 36, wherein said polyester is poly(ethylene terephthalate).

42. A particle of claim 36 wherein said polyester has an intrinsic viscosity within the range of about 0.25 dL/g to about 0.35 dL/g.

* * * * *